United States Patent
Iwami (10) Patent No.: US 7,142,155 B2
(45) Date of Patent: Nov. 28, 2006

(54) GPS RECEIVER

(75) Inventor: Hiroaki Iwami, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 11/266,597

(22) Filed: Nov. 3, 2005

(65) Prior Publication Data

US 2006/0114151 A1 Jun. 1, 2006

(30) Foreign Application Priority Data

Nov. 10, 2004 (JP) ............................. 2004-327127

(51) Int. Cl.
*G01S 5/04* (2006.01)
*H04B 7/185* (2006.01)

(52) U.S. Cl. ........................ 342/357.06; 342/357.12; 342/357.15

(58) Field of Classification Search ........... 342/357.01, 342/357.02, 357.06, 357.12, 357.15; 701/207, 701/213

See application file for complete search history.

(56) References Cited

U.S. PATENT DOCUMENTS 5,323,163 A 6/1994 Maki

2005/0149261 A9 * 7/2005 Lee et al. .................... 701/210
2005/0253755 A1 * 11/2005 Gobara ................... 342/357.15

* cited by examiner

*Primary Examiner*—Dao L. Phan
(74) *Attorney, Agent, or Firm*—Brinks Hofer Gilson & Lione (57) ABSTRACT

A GPS receiver calculates a position with as high accuracy as possible by appropriately setting a threshold of a reception level of the signal from each GPS satellite and a DOP threshold based on an interrelation between the satellites. A positioning calculator performs predetermined positioning calculation using a reception signal from each satellite. When the reception level of the satellites are below a threshold set by a reception-level-threshold setting section, and thus a positioning-calculation determination section determines that the positioning cannot be performed, a threshold change processor gradually relaxes the threshold. Once relaxing the threshold enables the positioning calculation, a DOP value is determined from a constellation of the satellites used for the positioning calculation, and then is compared with a DOP threshold set by a DOP threshold setting section. If a DOP value determination section determines that the DOP threshold is not satisfied, the DOP threshold is relaxed.

20 Claims, 5 Drawing Sheets

EXAMPLE OF RELAXATION OF SPECIFIED RECEPTION LEVEL OF GPS SIGNAL

FIG.5

EXAMPLE OF GPS SATELLITE CONSTELLATION

FIG.6(a)

SIGNAL RECEPTION CONDITION

| SATELLITE NUMBER | RECEPTION LEVEL (dBm) |
|---|---|
| 3 | −134 |
| 7 | −129 |
| 11 | −120 |
| 12 | −143 |
| 21 | −150 |
| 25 | −124 |
| 29 | −138 |
| 31 | −131 |

FIG.6(b)

RECEPTION LEVEL, DOP THRESHOLD TABLE

| RECEPTION LEVEL THRESHOLD | SATELLITE NUMBER FOR POSITIONING USE | DOP THRESHOLD | DOP WITH RESPECT TO POSITIONING SOLUTION | POSITIONING SOLUTION | HIGH-PRECISION POSITIONING SOLUTION |
|---|---|---|---|---|---|
| −123 | 11 | 1.5 | − | × | NG |
| −126 | 11, 25 | 1.5 | − | × | NG |
| −129 | 11, 25, 7 | 1.5 | 3.1 | ○ | NG |
| −129 | 11, 25, 7 | 3.0 | 3.1 | ○ | NG |
| −132 | 31, 11, 25, 7 | 3.0 | 2.7 | ○ | OK |
| −132 | | 5.0 | | ○ | NC |
| −135 | | 5.0 | | ○ | NC |
| −135 | | 10.0 | | ○ | NC |
| −138 | | 10.0 | | ○ | NC |
| −138 | | 20.0 | | ○ | NC |

GPS RECEIVER

BACKGROUND OF THE INVENTION

1. Field of the Invention

The present invention relates to a global positioning system (GPS) receiver which receives a signal from a GPS satellite in measurement of a present position to measure the precise position, while capable of securely obtaining data on the present position, and to a GPS reception method using same.

2. Description of the Related Art

In recent years, navigation apparatus widely used in vehicles have employed one or both of a autonomous navigation method and a GPS navigation method as a measurement method in measurement of a position of a vehicle, the combination of these navigation methods being referred to as a hybrid navigation method. The autonomous navigation method involves calculating a travel distance from signals indicative of a vehicle speed or based on an acceleration sensor, and determining a rotation angle of the vehicle based on an azimuth detection sensor such as an angular speed sensor or the like, thereby constantly adding the travel direction taken and the traveled distance to those previously determined. The GPS navigation method involves receiving electric waves from a GPS satellite to detect the present position.

To display the present position of the vehicle and the travel direction thereof thus determined on a map screen in the navigation apparatus, map data about a map covering the present position and its surroundings is read from a map data storage medium, such as a DVD-ROM, installed in the navigation apparatus, and an electronic map associated with the map data is displayed on a monitor screen with a mark indicative of the vehicle position being superimposed and displayed on the map. The navigation apparatus has a map matching function of matching a measured position of the vehicle onto an appropriate map route by comparison with data about roads on the map so as to display the vehicle position on the map. When there is a plurality of roads taken as a candidate after determination of the position of a moving member, this map matching function is performed to select a road with the highest existing probability from among the roads as the appropriate road, for example, by giving a high priority to the route along which the vehicle is being guided.

In such a navigation apparatus, it is very important to accurately measure the present position of the vehicle. In particular, in cases where the data mainly used is reception data from the GPS satellites, the GPS data itself to be received must be precise, and the GPS satellite constellation needed for the measurement must be appropriate. In receiver techniques, the so-called "all-in-view" mode in which all visible satellites are used for positioning calculation has recently become mainstream. It is further very important to select appropriate satellites from among all the visible satellites.

Note that the above-mentioned GPS receiver for receiving the signals of the GPS satellites to measure the present position is used not only for the above navigation apparatus mounted on the vehicle or the like, but for other devices, such as a personal computer, a portable information terminal, a portable telephone, or the like. Thus, the GPS receiver is widely used in various fields for precise measurement of the present position and displaying it on the map screen.

For measurement of the present position using the GPS satellites as described above, the reception signals including the GPS data to be received must be precise, while the signals actually received from the GPS satellites may be degraded by attenuation due to an inappropriate distance from the GPS satellite or due to obstacles, such as clouds high in the sky, or by occurrence of multipath noise due to the influence of surrounding buildings or the like. Since the large electric field strength of electric waves from the GPS satellite enables precise detection of the position, an S/N value associated with the electric field strength of the electric waves received from the GPS receiver is measured. Then, an S/N threshold is set such that the GPS data with the S/N value less than a predetermined value is not used for the positional detection. On the other hand, when the threshold is set to the higher value so as to use only the highly reliable signals of the GPS satellites, the number of the GPS satellites which can be used for the positional detection becomes decreased.

An influence on the measurement precision or accuracy of the GPS satellite constellation needed for measurement is represented by a dilution of precision (DOP) value (hereinafter referred to as a DOP value). The DOP value indicates a numerical value representing the arrangement or constellation of a plurality of GPS satellites used for measurement of the present position. For example, when three or more of the GPS satellites are used to detect the present position, the DOP value is represented by the value of an area enclosed by the plurality of GPS satellites. The smaller the DOP value, the more accurate the position detection can be.

In selection of a combination of the satellites with the smallest DOP value from among the visible satellites, if the smallest DOP value of the combination is larger than a predetermined value, accurate positional data is not available. Thus, the data obtained from the satellites whose DOP value is larger than a predetermined threshold is not used. For this reason, setting the threshold to the smaller value enables usage of the more accurate data, but the combination of the satellites which satisfy the threshold may not often be obtained, thus resulting in failure in detection of the present position by the GPS satellites.

It should be noted that there are proposed various types of techniques for performing appropriate position detection considering the above-mentioned DOP value, and that one of these techniques is disclosed in a JP-A-6-18644. This technique involves calculating a DOP value of each of the possible combinations of a predetermined number of visible satellites at predetermined calculation time intervals, and selecting the combination of the satellites with the smallest DOP value. In performing positioning calculation based on the reception data of the satellites constituting the combination selected, the limit of the DOP value is pre-set. Even if a combination of the satellites other than the combination previously selected has the minimum DOP value at the DOP value calculation timing, as long as the DOP value of the combination previously selected does not exceed the limit pre-set, the combination selected is maintained for the positioning calculation thereby to prevent changes in data due to a change from the selected combination of the satellites for the positioning calculation to another for a short period of time, thus resulting in a smooth track of the present position obtained from the positioning calculation.

In the above-mentioned GPS receiver used, for example, in the navigation system, the personal computer, the portable information terminal, the portable telephone, or the like, it is important to accurately determine the present position. In addition, the GPS receiving system is required to be able to measure the position with high accuracy using the high-quality signals and by use of the satellites with high probability. However, the noise effect, the obstacles in a propagation path, or the multipath effect may degrade the reception signals, which include error components, leading to an increased error in the position measured.

On the other hand, in some cases, the reception signals may not be used for the positioning calculation due to low level thereof, and the DOP value of the satellite constellation may become so large at the timing of positioning calculation, whereby the reliability of result of the positioning calculation may become low, and the positioning solution cannot be utilized.

These two phenomena have the characteristics opposite to each other. To aim for the high-accuracy positioning, tightening adoption criteria of signals to enhance the quality thereof, or setting strictly the DOP value that serves as an adoption criterion of a positioning solution leads to a low probability of positioning or measurement. In contrast, lowering criteria of signal quality for increasing the probability of positioning, or setting widely the criterion of the DOP value can improve the positioning probability, but results in degradation in the measurement accuracy. These problems are mutually contradictory.

Figure 3:
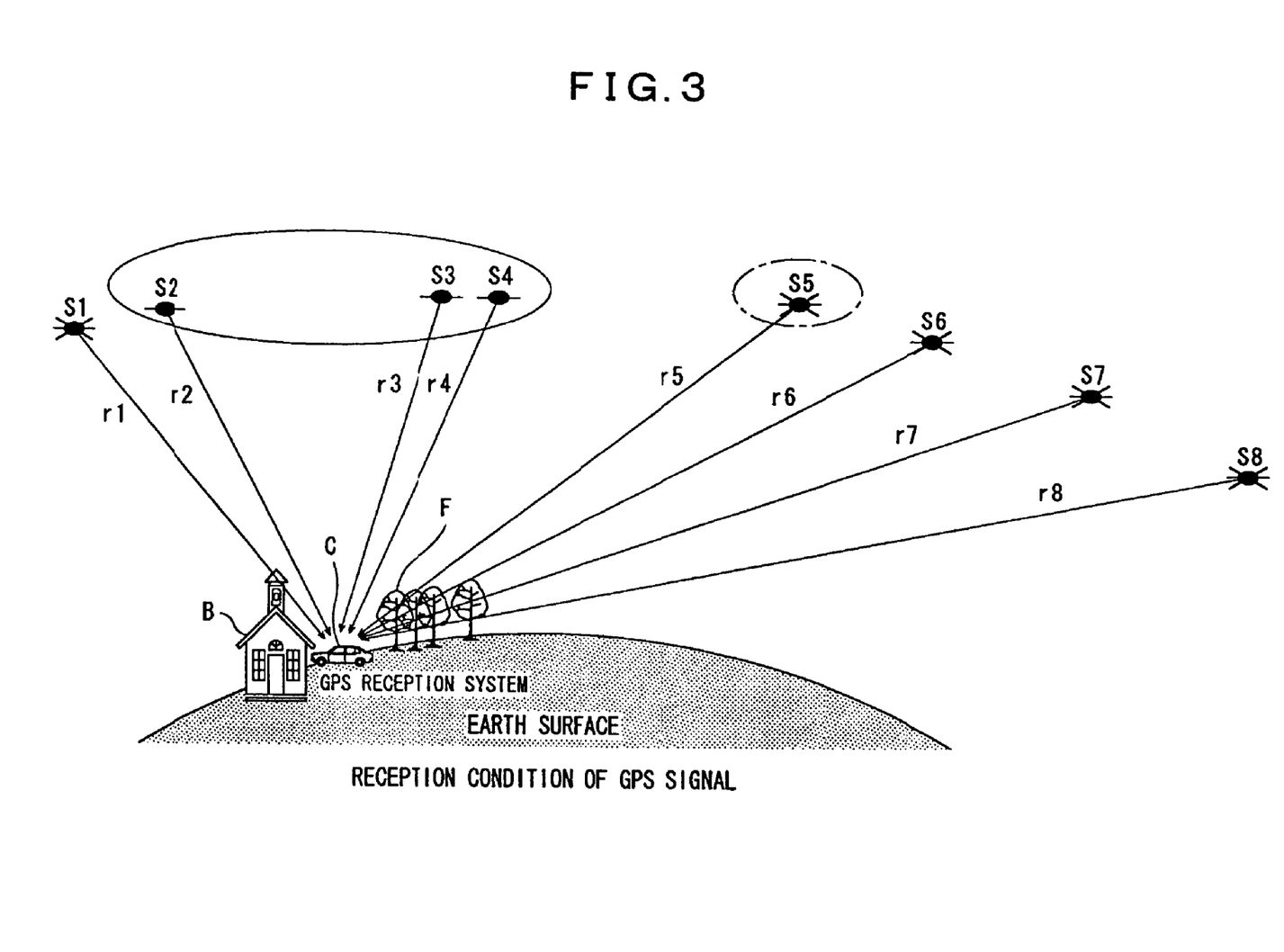
FIG. 3 is a schematic diagram explaining a reception condition of GPS signals.

This situation is illustrated in FIG. 3. That is, as shown in FIG. 3, in a GPS system mounted on a vehicle C, GPS satellites currently receivable are designated by reference numerals S1 to S8, and distances from the respective GPS satellites to the vehicle are designated by reference numerals r1 to r8. The GPS satellite S1 is affected by a nearby construction B, and the GPS satellites S5 to S8 are affected by a forest F, resulting in degradation in reception signals therefrom. Since only signals from three GPS satellites S2 to S4 satisfy a threshold value previously set, only these three GPS satellite signals are used to measure the position. Alternatively, if the three GPS signals are not sufficient to allow the appropriate positioning, then the position measurement by the GPS satellites may not be taken until four GPS satellite signals can respectively satisfy the threshold after the vehicle further moves. As mentioned above, heightening the threshold value with respect to the reception signal from the GPS satellite for the accurate position measurement may result in decreased number of the GPS satellites that meet the threshold. This may often fail to measure the position using the GPS satellites.

The same goes for the following situation. That is, in addition to the level of reception signals from the respective GPS satellites, when only the combination of the GPS satellites are selected whose DOP value based on the positional relationship among the GPS satellites exceeds a pre-set threshold value, heightening the DOP threshold value may also lead to decrease in the number of the GPS satellites that satisfy the threshold.

Thus, in the conventional GPS receivers, the threshold value of the level of reception signal from each of the GPS satellites is set and fixed, and the DOP value based on an interrelation between the satellites is also set and fixed in selection of the appropriate GPS satellites from all visible satellites for reception of the signals from the GPS satellites and for performing positioning. Tightening up these thresholds to improve the measurement accuracy often fails to perform the positioning using the GPS satellites. Especially, the recent GPS receiver is required to measure the position with high sensitivity and accuracy, taking into consideration an application to the portable telephone.

SUMMARY OF THE INVENTION

To solve the foregoing problems, the invention has a main object to provide a GPS receiver that can measure a position of interest using GPS satellite signals with as high accuracy as possible by appropriately setting a threshold of a reception level of the signal from each GPS satellite and a DOP threshold based on an interrelation between the satellites.

As mentioned above, most of existing GPS receivers employ the high-sensitivity all-in-view type receiver based on the principle that "the receiver should receive as many signals as possible and converge the results of positioning calculation". Thus, the signal attenuated or lacking in data due to a multipath wave or obstacles in a propagation path, or the signal affected by noise may also be included in the positioning calculation, which often leads to a significant influence of error signals on the measurement, or results in an erroneous measurement calculation. In contrast, in the present invention, the signal whose reception level is less than a reception level, which is to be regularly received with some margin, is discarded from an object of reception, thereby enabling initial setting so as to obtain the result of measurement with high accuracy without being influenced by the signal attenuated or lacking in data due to the multipath wave or the obstacles in the propagation path, or by the signal affected by noise, as described above.

Conventionally, when too much importance is placed on the reception level, a sufficient number of satellite signals to measure the position may not be available, or a good satellite constellation may not be obtained, whereby the result of measurement may often be affected by the DOP value, leading to large errors in the measured position. In contrast, in the invention, a condition in which a positioning solution is first obtained by gradually relaxing the thresholds of the reception level and of the DOP value is set as the most optimal measurement condition, where the best measurement solution can be obtained. This eliminates as many error signals as possible in the all-in-view reception mode, but relaxes the DOP threshold value with increased signal errors, following a middle course between both optimal conditions of the reception level and of the DOP value.

In the known general receiver for vehicles including the all-in-view type one, the thresholds of the reception level and of the DOP value are fixed. If this fixed condition is not satisfied, then the receiver will be in a "non-measurement" state, and thus the measurement solution cannot be obtained. However, in the invention, the thresholds of the reception level and of the DOP value are individually relaxed, which leads to a high possibility of obtaining any measurement solution. Although, at this time it is anticipated that there may be large errors in positioning or measurement after the relaxation, the positioning condition is transmitted to a host side, where reliability of positioning information is checked, and the information is utilized depending on the reliability checked, thereby achieving an effective reception system.

The invention offering the above-mentioned functions employs the following means. More specifically, in one aspect of the invention, there is provided a GPS receiver which comprises GPS satellite signal reception means for receiving a signal from a GPS satellite, reception level determination means for determining whether or not a reception level of the satellite signal received is equal to or more than a predetermined reception level threshold, positioning calculation means for performing positioning calculation using the plurality of GPS satellite signals received, positioning-calculation determination means for determining whether or not predetermined positioning calculation is performed by the positioning calculating means, DOP value determination means for determining whether or not a result of the calculation performed by the positioning calculation means satisfies a pre-set DOP threshold, threshold change processing means for gradually relaxing and changing a selected one of the reception level threshold and the DOP threshold when the positioning-calculation determination means determines that the predetermined calculation is not performed, or when the DOP value determination means determines that the pre-set DOP threshold is not satisfied, and data output means for sending the result of the calculation performed by the positioning calculation means when the positioning-calculation determination means and the DOP value determination means determine that both the thresholds are satisfied.

In another aspect of the invention, the threshold change processing means of the GPS receiver alternately changes the DOP threshold and the reception level threshold.

In another aspect of the invention, the threshold change processing means of the GPS receiver first changes the DOP threshold when the DOP value determination means determines that the DOP threshold is not satisfied.

In another aspect of the invention, the reception level threshold and the DOP threshold are previously set to respective initial threshold values each of which provides high-accuracy positioning in the GPS receiver.

In another aspect of the invention, the data output means of the GPS receiver sends a positioning solution obtained by the positioning calculation and a positioning condition in which the positioning solution is obtained.

In another aspect of the invention, the positioning condition in the GPS receiver includes at least one of the reception level threshold, the DOP threshold, and the number of satellites used in the positioning calculation.

In another aspect of the invention, the reception level threshold of the GPS receiver is capable of being set to a predetermined value that is different depending on the satellite for reception.

In another aspect of the invention, the positioning-calculation determination means in the GPS receiver includes positioning-calculation determining means for determining whether the positioning solution is obtained or not. When the positioning-calculation determining means determines that the positioning solution is obtained, the DOP value determination means performs the determination of the DOP value.

In another aspect of the invention, there is provided a GPS reception method which comprises receiving signals from a plurality of GPS satellites, measuring a position using the GPS satellite reception signal whose reception level is equal to or more than a predetermined reception level threshold, gradually relaxing the setting of the reception level threshold and of a threshold of a DOP value when the DOP value obtained upon measuring the position does not satisfy the pre-set DOP threshold, and generating positioning data obtained when the DOP threshold is satisfied.

In another aspect of the invention, the relaxing and changing the setting of the threshold in the GPS reception method includes alternately changing the DOP threshold and the reception level threshold.

In another aspect of the invention, the reception level threshold and the DOP threshold are previously set in the GPS reception method to respective initial thresholds, each of which provides high-accuracy positioning.

In another aspect of the invention, the GPS reception method further comprises generating a positioning condition together with the positioning data obtained when the DOP threshold is satisfied.

In another aspect of the invention, the positioning condition in the GPS reception method includes at least one of the reception level threshold, the DOP threshold, and the number of satellites used for the positioning calculation.

In another aspect of the invention, the reception level threshold in the GPS reception method is capable of being set to a predetermined value that is different depending on the satellite for reception.

In the invention, the higher initial threshold is pre-set for the reception level of the signal received as mentioned above, thereby preventing the use of the GPS satellite signal including error components influenced by a multipath, obstacles in a propagation path, or noise. This results in a high-accuracy result of the positioning calculation, thus decreasing fluctuations in positioning data. In addition, a higher-accuracy positioning solution can be provided, taking into consideration the DOP value.

More specifically, in the invention, even if the initial threshold is set to the higher possible value which tends to provide the sufficiently high-accuracy result of calculation as compared to the prior art, when the initial threshold is not satisfied, the threshold is gradually relaxed, so that the appropriate positioning solution can be smoothly obtained. Thus, the initially threshold can first be set to the value which tends to provide the sufficiently high accuracy.

On the other hand, in the known receiver which determines whether or not the positioning solution is determined based on a predetermined threshold previously set, even if any positioning solution is necessary or required, when the reception level condition and the DOP threshold are not satisfied, the positioning solution itself cannot be obtained. In the invention, a specified value of the reception level and that of the DOP value are gradually decreased, and once the positioning is available, the most appropriate positioning solution in that case can be obtained.

The reception method involves gradually relaxing the DOP threshold as well as the reception level threshold as mentioned above. This can provide the substantially optimal high-accuracy positioning solution in the condition where a good balance between both the reception level and the DOP value is achieved.

When the condition for generating or sending the positioning calculation is relaxed, the positioning information with the positioning condition attached thereto is transmitted to the host side, where the positioning data received can be appropriately utilized, taking into consideration the reliability of the positioning information. By notifying the host of the high-accuracy positioning solution, a low-reliability case, or the like, the positioning information can serve more uses. The use of the above-mentioned method may sacrifice the positioning precision, but can improve the probability of positioning. The positioning data is dealt with considering the positioning condition, thereby improving its applicability.

DESCRIPTION OF THE PREFERRED EMBODIMENTS

An exemplary embodiment of the invention employs the following means in a GPS receiver, thereby achieving the object to measure a position of interest using GPS satellite signals with as high accuracy as possible by appropriately setting a threshold value of a reception level of the signal from each GPS satellite and a DOP threshold value based on the interrelation between the satellites. That is, the GPS receiver according to the embodiment of the invention comprises GPS satellite signal reception means for receiving a signal from a GPS satellite, reception level determination means for determining whether or not a reception level of the satellite signal received is equal to or more than a predetermined value, positioning calculation means for performing positioning calculation using a plurality of GPS satellite signals received, positioning-calculation determination means for determining whether or not predetermined positioning calculation is performed by the positioning calculation means, DOP value determination means for determining whether or not a result of the calculation performed by the positioning calculation means satisfies a pre-set DOP threshold, threshold change processing means for gradually relaxing and changing a selected one of the reception level threshold and the DOP threshold when the positioning-calculation determination means determines that the predetermined calculation is not performed, or when the DOP value determination means determines that the pre-set DOP threshold is not satisfied, and data output means for generating or sending the result of the calculation performed by the positioning calculation means when the positioning-calculation determination means and the DOP value determination means determine that both the thresholds are satisfied. To achieve the foregoing object, a GPS reception method for the above GPS receiver comprises receiving signals from a plurality of GPS satellites, performing positioning using the GPS satellite reception signal whose reception level is equal to or more than the predetermined value, gradually relaxing setting of a threshold of the reception level and a threshold of the DOP value when the DOP value obtained upon measuring the position does not satisfy the pre-set DOP threshold, and generating positioning data obtained when the DOP threshold is satisfied.

First Embodiment

Figure 1:
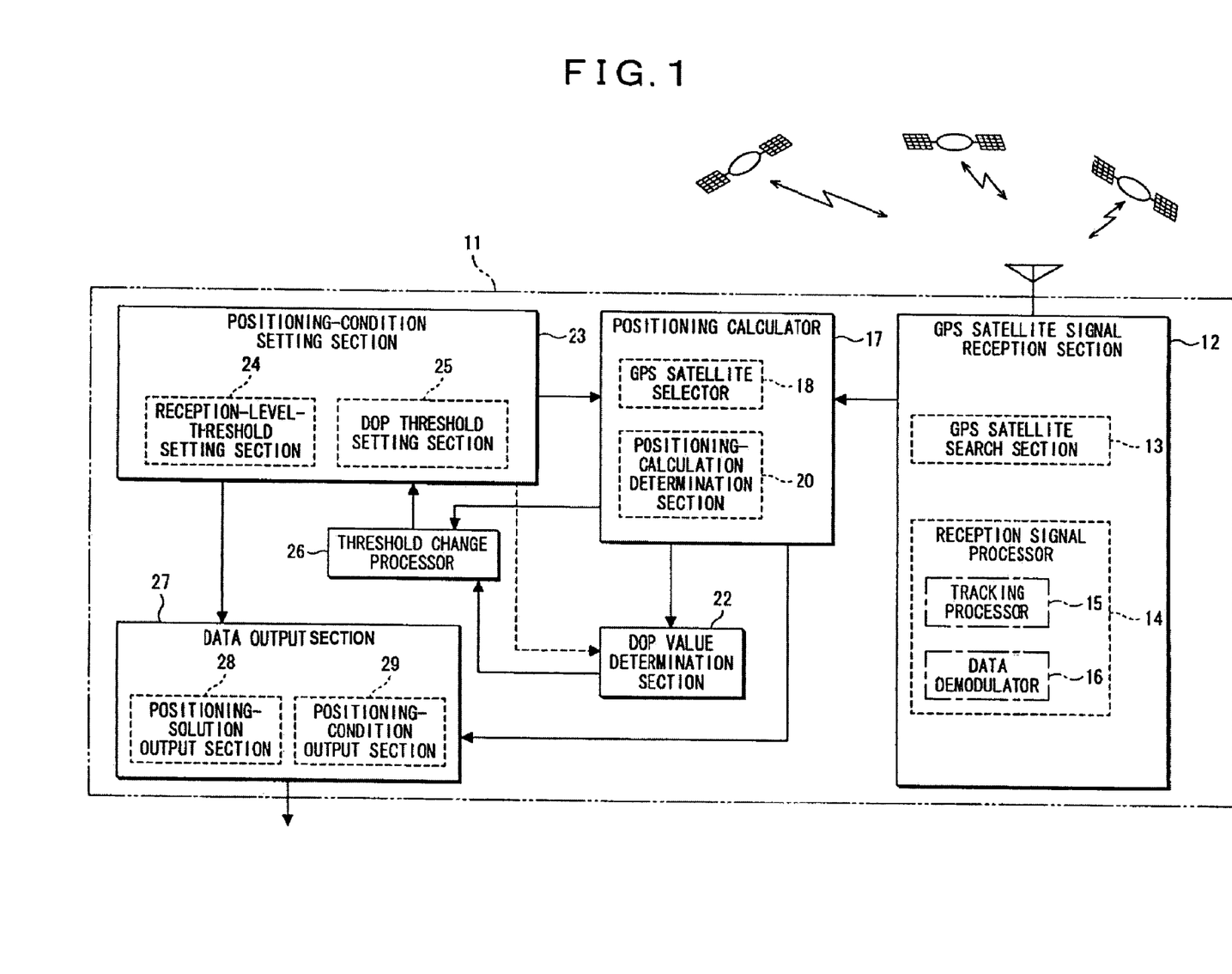
FIG. 1 is a functional block diagram showing a preferred embodiment of the invention.

Reference will now be made in detail to the exemplary embodiment which is illustrated in the accompanying drawings. FIG. 1 is a diagram showing functional blocks for performing various functions in the GPS receiver of the embodiment, and an interrelationship among the functional blocks. Note that these functional parts or blocks serve as means for performing the respective functions.

In an example of a GPS receiver 11 shown in FIG. 1, GPS satellites designated by a GPS satellite search section 13 are searched for, and signals from the satellites are received by the GPS satellite signal reception section 12 in the all-in-view mode, in which the signals from all the visible satellites are received. The signals received are processed by a tracking processor 15, a data demodulator 16, or the like of a reception signal processor 14, and then the signals processed are sent to a positioning calculator 17.

In the positioning calculator 17, a GPS satellite selector 18 selects from among the signals received from the GPS satellites in the all-in-view mode, some signals from several GPS satellites whose reception levels respectively satisfy a reference threshold set by a reception-level-threshold setting section 24 of a positioning-condition setting section 23, which will be described later, and thus which can be subjected to positioning calculation. The positioning calculator 17 performs positioning calculation using the signals received from the GPS satellites selected. A positioning-calculation determination section 20 determines whether predetermined positioning calculation is capable of being carried out or not in the positioning calculator 17. As a result, when it is determined that the positioning calculation cannot be carried out, a threshold change processor 26 is given an instruction to perform threshold change processing, and then performs the threshold change processing for relaxing a reception level threshold by an amount previously set as a change. This gradually relaxes the reception level threshold set in the reception-level-threshold setting section 24 of the positioning-condition setting section 23.

A DOP value determination section 22 determines whether or not a DOP value determined from a positional relationship among the GPS satellites calculated by the positioning calculator 17 satisfies a predetermined DOP threshold set by a DOP threshold setting section 25 of the positioning-condition setting section 23. If the DOP threshold is determined not to be satisfied, the threshold change processor 26 relaxes the reception level threshold or the DOP threshold by the amount previously set. This gradually relaxes and sets the corresponding threshold in the reception-level-threshold setting section 24 or the DOP threshold setting section 25 of the positioning-condition setting section 23.

When the positioning calculator 17 obtains a positioning solution that satisfies the relaxed threshold after the aforesaid relaxation processing of the threshold, the positioning solution is sent from a positioning-solution output section 28 of a data output section to a navigation apparatus or the like. Thus, when the positioning solution is obtained, a positioning condition finally set, a DOP value, and the like are downloaded from the positioning-condition setting section 23, and are sent from a positioning-condition output section 29 as reference data or the like for usage of the positioning solution by various data processors in the navigation apparatus, which makes use of the positioning solution. Note that the positioning condition generated at this time includes at least one of the reception level threshold, the DOP threshold, and the number of satellites used in the positioning calculation, all of which may be generated. Alternatively, they may be given appropriate respective coefficients and be processed by a predetermined calculation to be calculated. Such output data of the positioning condition may be subjected to appropriate calculation processing in each processor which uses the data, and be utilized therein.

Figure 2:
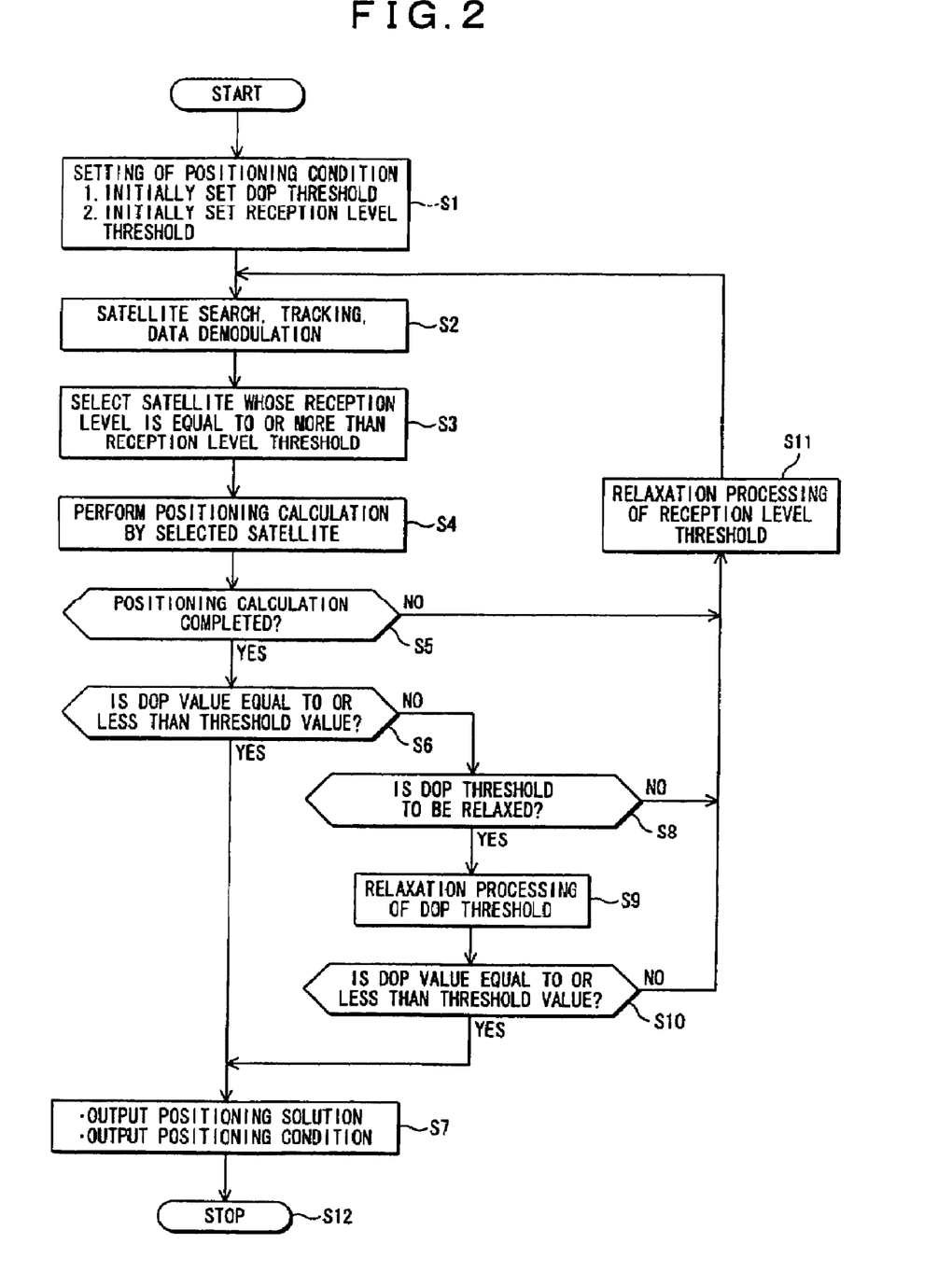
FIG. 2 is a flowchart showing an operation in the embodiment.

The GPS receiver of the embodiment with the above-mentioned functional configuration can be operated, for example, as shown in an operational flowchart of FIG. 2. Now, the operational flowchart of FIG. 2 will be explained in detail with reference to the functional block diagram of FIG. 1, an example of reception condition of GPS signals of FIG. 3, an example of relaxing a specified value for a reception level of the GPS signal of FIG. 4, and an example of a GPS satellite constellation of FIG. 5. In the exemplary embodiment of the invention, a first positioning condition, namely, a DOP threshold indicative of an influence on measurement accuracy of a GPS satellite constellation mentioned above is initially set, and also another threshold is set for a strength level of a reception signal appropriate for use in measurement and selected from among the GPS satellite signals receivable (step S1). The reception level threshold in use may be set in common to all the visible GPS satellites. Alternatively, the reception level threshold may be set individually to each GPS satellite. These thresholds, namely, the DOP threshold and the reception level threshold are set by the reception-level-threshold setting section 24 and the DOP threshold setting section 25 in the positioning-condition setting section 23 of FIG. 1, respectively.

Then, receivable satellites are searched for, and the received signals from the receivable GPS satellites are subjected to tracking and demodulation (step S2). Such processing is performed by each corresponding processor of the GPS satellite signal reception section 12 as shown in FIG. 1. Then, reception levels of the demodulated signals thus obtained are determined. Positioning calculation is performed using only the satellites whose reception levels satisfy an initially set value of the reception level threshold, which is set at the step S1 (step S3). As described above, some satellites whose reception levels each are equal to or more than the threshold pre-set are selected from all the GPS satellites received (step S3). Then, the positioning calculation is carried out using only the signals of the satellites whose reception level can satisfy the threshold (step S4). This processing can remove the GPS degraded signal more surely. Note that the positioning calculator 17 shown in FIG. 1 performs the positioning calculation by downloading the signals from the GPS satellite signal reception section 12 with reference to the threshold set at the reception-level-threshold setting section 24 of the positioning-condition setting section 23.

Then, it is determined whether the positioning calculation can be done or not (step S5). If the positioning calculation cannot be performed due to the small number of satellites whose reception level is equal to or more than the reception level threshold, or the like, the operation will proceed to a step S11, where relaxation processing of the reception level threshold is performed to change the value of the reception level threshold initially set at the step S1. Since the initially set threshold is previously set to the small value as mentioned above, when the positioning calculation can be performed using the satellite signals that satisfy the threshold initially set at the step S5, the high-accuracy stable positioning data can be provided, and then the operation proceeds to a step S6.

Figure 4:
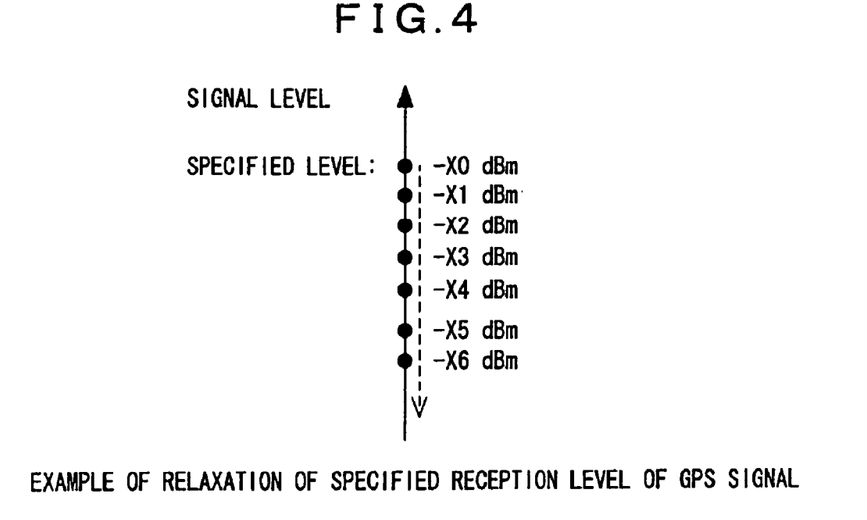
FIG. 4 is a diagram showing an example of relaxation of a specified reception level of the GPS signal for implementing the embodiment of the invention.

At the step S11 after the positioning calculation is determined not to be completed at the step S5, when the reception level threshold initially set is a specified level of −X0 dBm as shown in FIG. 4, the relaxation processing of the reception level threshold is performed which involves relaxing from −X0 dBm to another specific relaxed level of −X1 dBm. More specifically, the positioning-calculation determination section 20 of FIG. 1 determines whether or not the positioning calculation can be performed or not. If it is determined that the positioning calculation cannot be done, the threshold change processor 26 relaxes the threshold of the reception-level-threshold setting section 24 to carry out the relaxation processing. Thereafter, at the step S3 as mentioned above, the GPS satellites which satisfy the reception level threshold are selected from all the GPS satellites received, the positioning calculation is performed using the selected satellites, and then it is determined again whether the positioning calculation is completed or not at the step S5.

As a result of the determination, when the calculation is not completed yet, the same steps are repeatedly carried out to perform the relaxation processing for lowering the specified threshold level again as shown in FIG. 4. Once the positioning is available by sequentially lowering the specified threshold level, the operation proceeds to the step S6. The result of this processing will be, for example, as follows: in an example of FIG. 3, the GPS satellites satisfying the specified value initially set are only satellites S2, S3, and S4, and if four GPS satellites needed for the predetermined positioning are not available, then the specified level, namely, the threshold is relaxed by the relaxation processing so as to include data on the GPS satellite S5 in the positioning calculation. In this condition, it can be determined at the step S5 of FIG. 2 that the positioning calculation is completed.

The positioning calculation determined in the above manner can improve the position measurement accuracy, but in some cases may decrease the number of satellites usable. The shortage of the positioning satellites cannot provide a good positional relationship between the satellites, leading to the degraded DOP value. Such a case may often be regarded as the case of non-positioning or non-measurement, whereby the positioning solution may not be used when necessary.

In the embodiment of the invention, when the positioning calculation is determined to be completed at the step S5, it is determined whether or not the DOP value based on the satellite constellation satisfies the DOP threshold initially set at the step S1 (step S6). If the DOP threshold is not satisfied, any one of the DOP threshold and the reception level threshold is relaxed. That is, it is determined whether or not the DOP value is relaxed (step S8). If the DOP threshold is determined to be relaxed, the relaxation processing of the DOP threshold is performed (step S9). More specifically, in this processing, the DOP value determination section 22 of FIG. 1 determines whether the threshold set by the DOP threshold setting section 25 of the positioning-condition setting section 23 is satisfied or not. If the threshold is not satisfied, the threshold change processor 26 relaxes the threshold set in the DOP threshold setting section 25. In contrast, when the DOP threshold is determined not to be relaxed at the step S8, that is, when the reception level threshold is determined to be relaxed, the operation proceeds to the step S11, and the same steps as mentioned above will be repeatedly performed.

When the relaxation processing of the DOP threshold is performed at the step S9, it is determined again whether or not the result of positioning calculation of combinations of the GPS satellites each of which satisfies the reception level threshold as mentioned above satisfies the DOP threshold relaxed (step S10). When the combination of the GPS satellites each of which satisfies the current reception level threshold does not meet the DOP threshold yet as a result of the determination, the operation proceeds to the step S11, and the relaxation processing of the reception level threshold is performed again. The relaxation processing sequentially relaxes the threshold to a value pre-set as shown in FIG. 4. The following steps are the same as those described above, which results in the increased number of the satellite combinations each of which is an object to be determined whether the DOP value thereof meets the DOP threshold or not. In most cases, during a repeat performance of the relaxation processing of the reception level threshold and of the DOP threshold at the step S8, a DOP value of one combination comes to satisfy the threshold.

Figure 5:
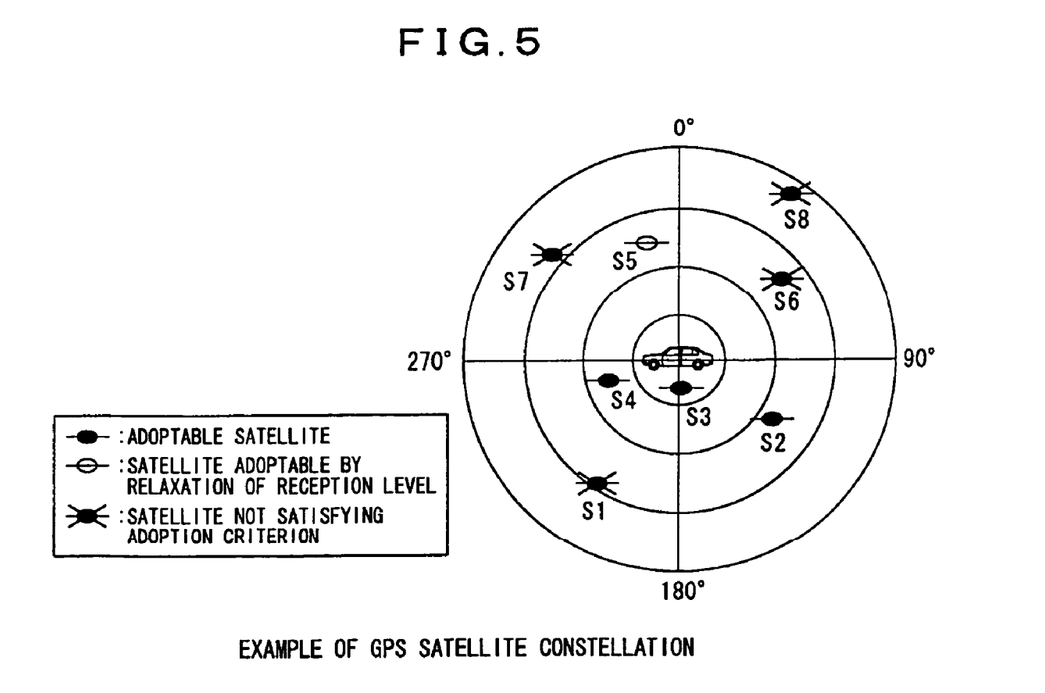
FIG. 5 is a diagram showing an example of a GPS satellite constellation for implementing the embodiment.

This condition is exemplified, for example, by a model shown in FIG. 5. That is, when the GPS satellites which exceed the reception level threshold as a result, including, but not limited to the GPS satellites subjected to the relaxation processing of the reception level threshold, are the satellites S2, S3, and S4 in an example of FIG. 5, further relaxation of the reception level threshold renders a satellite S5 usable for positioning. This combination of the GPS satellites including the satellite S5 satisfies the DOP threshold to enable the positioning.

Thus, when the DOP threshold value is first satisfied with the reception level threshold being satisfied as mentioned above, a positioning solution is obtained to be used. The reception level threshold value relaxed, the DOP threshold value relaxed with the positioning calculation done, and the positioning solution are transmitted to the host side in a set (step S7), thereby completing a series of processing steps (step S12). In the output processing, the positioning-solution output section 28 outputs the positioning solution, and the positioning-condition output section 29 further outputs the above-mentioned positioning condition in which the positioning solution is obtained, in the data output section 27 of FIG. 1.

Figure 6A:
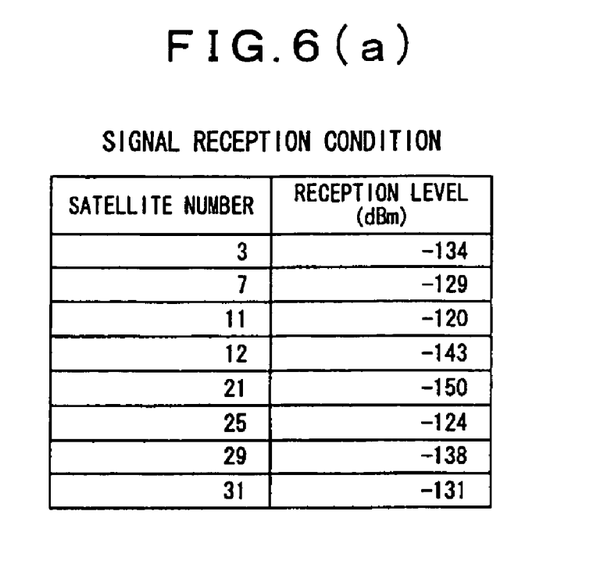
FIG. 6 illustrates tables of a relaxation condition of a reception level threshold and a DOP threshold, and of a positioning condition in the embodiment.

Now, the series of processing steps mentioned above will be explained in more detail, for example, with reference to FIG. 6. FIG. 6(a) shows an example of a satellite number of a visible satellite, and a reception level thereof (dBm), and FIG. 6(b) shows a condition in which satellites for positioning use are selected from the visible satellites by relaxation of the reception level threshold and the DOP threshold, thereby providing positioning solutions, thus finally resulting in a high-accuracy positioning solution.

Figure 6B:
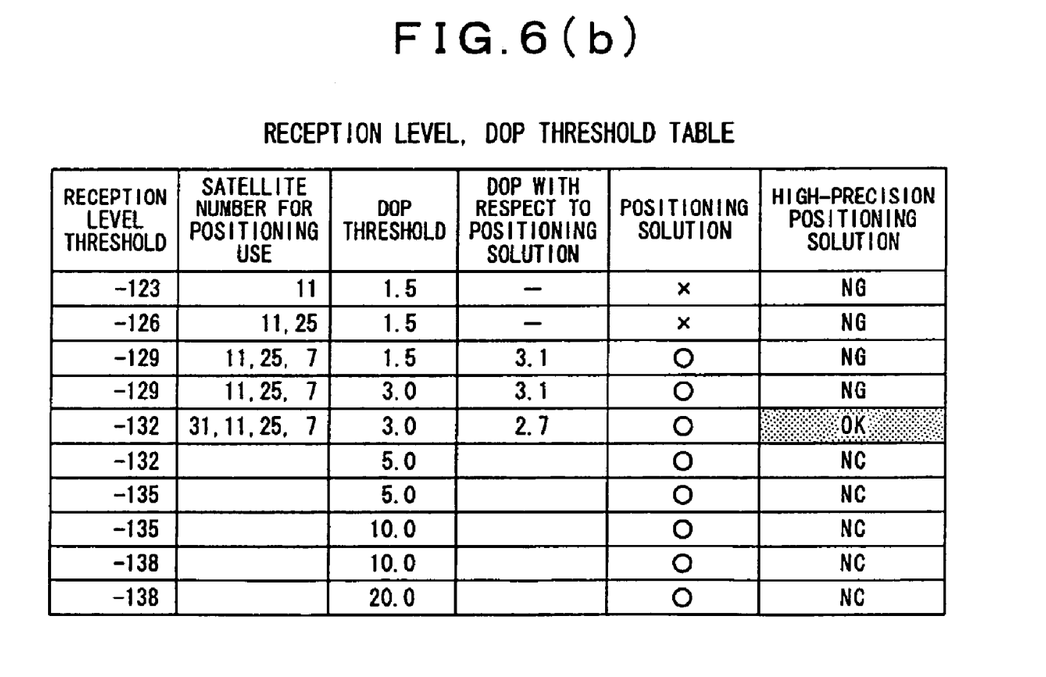

When a first reception level threshold is −123 dBm as shown in FIG. 6(b), a satellite which satisfies the threshold is only Satellite No. 11, which cannot perform positioning. At this time, output of a positioning solution is no good, that is, the positioning solution cannot be provided. Then, when the reception level threshold is relaxed from −123 dBm to −126 dBm by −3 dBm, Satellite No. 25 becomes usable for positioning. However, since at this time the number of the satellites for positioning use is two, normal positioning cannot be carried out, resulting in no positioning solution. Needless to say, a high-accuracy positioning solution is not also obtained, namely, NG.

When the reception level threshold is further relaxed by −3 dBm to a value of −129 dBm, Satellite No. 7 becomes usable, and thus the number of satellites available for positioning is three. In this case, the positioning can be performed using these satellites, thereby providing a positioning solution. Since at this time a satellite constellation has a DOP value of 3.1 with respect to the positioning solution, the DOP value does not satisfy a DOP threshold value of 1.5 for high accuracy set, and the production of a high-accuracy positioning solution is not obtainable, namely, NG. Thus, even though the DOP threshold with respect to the positioning solution is further relaxed to a next predetermined value, e.g. 3.0, the DOP value of 3.1 based on the satellite constellation with respect to the positioning solution does not meet the DOP threshold relaxed yet. In this case, the positioning solution is obtained, but a desired high-accuracy positioning solution is not obtained, namely, NG.

Then, when the reception level threshold is further relaxed by −3 dBm to −132 dBm, Satellite No. 31 becomes usable for positioning in this case, whereby the state of satellite constellation is improved, resulting in a DOP value of 2.7, which satisfies the DOP threshold of 3.0. Four satellites thus obtained can be used to determine the high-accuracy positioning solution, which will be OK. Note that in an example of FIG. 6, the relaxation condition of the reception level threshold may be set in sequence, for example, to −132, −135, and −138. Also, the DOP threshold may be set in sequence, for example, to 5.0, 10.0, and 20.0 as a preparation. The reception level threshold and the DOP threshold are alternately relaxed.

Note that in the embodiment, once the number of satellites which satisfy the reception level threshold is three, the positioning solution is obtained as mentioned above, but the invention is not limited thereto. In a special condition, the positioning solution may be set to be obtained when two satellites become usable for positioning. Alternatively, processing is set such that the positioning solution may be obtained when four satellites become usable for positioning. Instead of relaxing only the reception level threshold until the positioning solution is obtained, the DOP threshold may be set to appropriately decrease according to the relaxation of the reception level threshold.

As mentioned above, in the invention, positioning or measuring a position using the reception data from the GPS satellites can be surely carried out. At this time, parameters indicative of reliability of the positioning solutions are generated based on the data about the positioning condition. When the positioning solution is used by a calculator of the navigation apparatus or the like, which utilizes the GPS positioning solution, such reliability parameters transmitted with the positioning solution can be utilized to perform appropriate calculation processing in various types of fields of calculation.

It should be noted that the GPS receiver of the invention can be used in the wider field, for example, not only in the vehicle navigation apparatus widely mounted on the vehicles at present, but also in a portable personal computer, and a portable information terminal for measuring the present position. In addition, the GPS receiver may be mounted on a portable telephone recently put into practical use for accurately determining the present position.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A global positioning system (GPS) receiver comprising:
   a receiver operable to receive GPS satellite signals;
   a level determination section operable to determine whether or not a reception level of each of the GPS satellite signals received is approximately equal to or more than an associated reception level threshold;
   a positioning calculator operable to perform a position calculation using the GPS satellite signals that each satisfy the associated reception level threshold;
   a calculation determination section operable to determine whether or not the position calculation can be accurately performed based upon the GPS satellite signals that each satisfy the associated reception level threshold;
a dilution of precision (DOP) value determination section operable to determine whether or not the position calculation satisfies a DOP threshold; and
a threshold change processor operable to gradually relax at least one associated reception level threshold or the DOP threshold when the calculation determination section determines that the position calculation can not be accurately performed, or when the DOP value determination section determines that the DOP threshold is not satisfied.

2. The GPS receiver according to claim 1, comprising a data output section operable to generate position data when both the position calculation can be accurately performed and the DOP threshold is satisfied.

3. The GPS receiver according to claim 1, wherein the threshold change processor alternately changes the DOP threshold and the at least one associated reception level threshold.

4. The GPS receiver according to claim 3, wherein the threshold change processor first changes the DOP threshold when the DOP value determination section determines that the DOP threshold is not satisfied.

5. The GPS receiver according to claim 1, wherein each associated reception level threshold and the DOP threshold are initially set to respective initial threshold values.

6. The GPS receiver according to claim 1, comprising a data output section operable to generate a positioning solution based upon the position calculation and a positioning condition associated with the positioning solution.

7. The GPS receiver according to claim 6, wherein the positioning condition includes at least one associated reception level threshold, the DOP threshold, or the number of GPS satellite signals used in the position calculation.

8. The GPS receiver according to claim 1, wherein each associated reception level threshold is capable of being set to a different predetermined value corresponding to a specific GPS satellite.

9. The GPS receiver according to claim 1, wherein the calculation determination section is operable to determine whether a positioning solution is obtainable or not, and
wherein, when the positioning solution is obtainable, the DOP value determination section determines the DOP value.

10. A reception method for a global positioning system (GPS), the method comprising:
receiving GPS satellite signals from a plurality of GPS satellites;
calculating a position using at least one GPS satellite signal received whose reception level is approximately equal to or more than a reception level threshold;
gradually relaxing the setting of the reception level threshold and of a dilution of precision (DOP) value threshold when the DOP value associated with the position calculated does not satisfy the DOP threshold; and
generating positioning data when the DOP threshold is satisfied.

11. The method according to claim 10, wherein relaxing the setting of the thresholds includes alternately changing the DOP threshold and the reception level threshold.

12. The method according to claim 10, wherein the reception level threshold and the DOP threshold are initially set to respective initial threshold values intended to achieve a highly accurate position calculation.

13. The method according to claim 10, comprising generating a positioning condition together with the positioning data when the DOP threshold is satisfied.

14. The method according to claim 13, wherein the positioning condition includes at least one of the reception level threshold, the DOP threshold, and the number of GPS satellite signals used to calculate the position.

15. The method according to claim 10, wherein the reception level threshold is capable of being set to a number of predetermined values, each predetermined value associated with a specific satellite.

16. A reception method for a global positioning system (GPS), the method comprising:
receiving GPS satellite signals from a plurality of GPS satellites;
calculating a position using at least one GPS satellite signal received whose reception level is approximately equal to or more than a reception level threshold;
determining a dilution of precision (DOP) value associated with the position calculated; and
relaxing the reception level threshold and a DOP threshold when the DOP value does not satisfy the DOP threshold.

17. The method according to claim 16, comprising setting a different reception level threshold for each of the GPS satellite signals received.

18. The method according to claim 16, comprising alternately changing the reception level threshold and the DOP threshold.

19. The method according to claim 16, comprising generating a positioning condition that includes the reception level threshold and the DOP threshold.

20. The method according to claim 16, comprising initially setting the DOP threshold to a predetermined value based upon an interrelation between the plurality of GPS satellites.

* * * * *